(12) United States Patent
Price et al.

(10) Patent No.: US 7,658,106 B2
(45) Date of Patent: Feb. 9, 2010

(54) ADJUSTABLE MEASURING DEVICE (75) Inventors: Robert Price, Brooklyn, NY (US); Jeremy Brotchner, Forest Hills, NY (US)

(73) Assignee: Lifetime Brands, Inc., Westbury, NY (US)

(*) Notice: Subject to any disclaimer, the term of this patent is extended or adjusted under 35 U.S.C. 154(b) by 72 days.

(21) Appl. No.: 11/457,019

(22) Filed: Jul. 12, 2006

(65) Prior Publication Data

US 2007/0022810 A1 Feb. 1, 2007

Related U.S. Application Data

(60) Provisional application No. 60/699,797, filed on Jul. 15, 2005.

(51) Int. Cl.
*G01F 19/00* (2006.01)
*B67D 5/00* (2006.01)

(52) U.S. Cl. .............................. 73/429; 222/158

(58) Field of Classification Search ............ 222/158; D10/46.2; 73/429, 426, 427; 220/4.01
See application file for complete search history.

(56) References Cited

U.S. PATENT DOCUMENTS

| | | | | | |
|---|---|---|---|---|---|
| 1,602,937 | A | * | 10/1926 | Rieff | 73/429 |
| 1,737,735 | A | | 12/1929 | Schmidt | 73/429 |
| 2,157,262 | A | * | 5/1939 | Jansen | 73/429 |
| 2,527,348 | A | * | 10/1950 | Berkower | 73/429 |
| 2,583,808 | A | * | 1/1952 | Bernhardt | 73/429 |
| 2,625,044 | A | * | 1/1953 | Christie | 73/429 |
| 2,682,357 | A | * | 6/1954 | Bogossian | 141/268 |
| 2,690,080 | A | * | 9/1954 | Rich | 73/429 |
| 2,839,928 | A | * | 6/1958 | Fohrman | 73/429 |
| 3,049,926 | A | * | 8/1962 | Victor | 73/429 |
| 4,488,432 | A | * | 12/1984 | Bang | 73/429 |
| 6,026,685 | A | * | 2/2000 | Weterrings et al. | 73/429 |
| D451,828 | S | * | 12/2001 | McGuyer | D10/46.2 |

OTHER PUBLICATIONS

Int'l Search Report & Written Opinion for related PCT Application No. PCT/2006/027268 dated Aug. 7, 2007.

* cited by examiner

*Primary Examiner*—Hezron Williams
*Assistant Examiner*—Tamiko D Bellamy
(74) *Attorney, Agent, or Firm*—Ryan A. Schneider; Troutman Sanders LLP (57) ABSTRACT

An adjustable measuring device for measuring contents, such as liquids and granulated solids, having a usable volume for measuring. The adjustable measuring device includes a housing, a platform having a lower position and an upper position, and an adjusting system for moving the platform between the lower position and the upper position. When the platform is in the lower position, the usable volume is maximized. When the platform is in the upper position, the usable volume is minimized. The adjusting system comprises a restraint system adapted to maintain the platform between the lower position and the upper position. Also, the adjusting system comprises a discrete locking system adapted to temporarily lock the platform into a plurality of predetermined positions, which represent discrete usable volumes. By applying a first adjusting force, the platform moves toward the upper position. By applying a second adjusting force, the platform moves toward the lower position.

19 Claims, 7 Drawing Sheets

ADJUSTABLE MEASURING DEVICE

CROSS REFERENCE TO RELATED APPLICATION

This application claims priority of U.S. Provisional Patent Application No. 60/699,797, filed 15 Jul. 2005, the entire contents of which is hereby incorporated by reference.

TECHNICAL FIELD

The present invention relates generally to an adjustable measuring device, and in particular to an adjustable measuring device for liquids and granulated solids having a usable volume that can be adjusted by a rotational force applied to the adjustable measuring device.

BACKGROUND OF THE INVENTION

Measuring devices are used in a variety of industries, for many different purposes. Generally, measuring devices are used to measure contents such as liquid or dry materials that are to be subsequently dispensed from the measuring device. As the amount or quantity of the content to be measured depends on the situation, various measuring containers of different sizes and shapes have been used.

In the food industry and culinary arts, measuring cups are commonly used for measuring ingredients for recipes during food preparation and cooking. A busy kitchen can be the focal point of creation, disarray, and demanding conditions. Amateur and professional chefs are often required to multitask during the cooking and/or creation process. During the preparation of a recipe, a cook can experience difficulty measuring out the proper amounts of various ingredients such as flour, sugar, shortening, water, salt, and other staples. Moreover, the appropriately sized measuring container must be located, which can often involve searching through a collection of measuring bowls, spoons, cups, and scoops to find the correct measuring container, if one can be found at all. Such an experience can be cumbersome, time-consuming, and frustrating.

To alleviate this problem in the past, adjustable measuring containers have been proposed such that the capacity of the container can be adjusted, thereby eliminating the hunt for a separate container having the needed measuring volume. Such previously known adjustable measuring containers have been designed to be used in the measuring of granulated solids or semi-solids, but were generally incapable of containing liquids. Typically, these adjustable measuring containers incorporated slots and the like as part of the adjusting mechanism, through which liquid materials could pass through quite easily. Accordingly, previous adjustable measuring containers did not address a general use, because in ordinary kitchens it becomes very inconvenient to have to remember that a particular measuring cup cannot be used for liquid material.

Additionally, such previously known adjustable measuring cups have also been generally constructed so as to require an individual to visually read the measuring units on some part of the cup when adjusting from one capacity to another capacity. This construction is inconvenient in busy kitchens as such measuring units are often obscured by materials such as flour that are being used in food preparation and cooking. The individual, therefore, can find it difficult to ensure that the adjustable measuring cup is correctly adjusted for the current measurement required by a recipe.

To address these problems in the past, adjustable measuring cups with multiple fixed capacities have been proposed. Unfortunately, most of these adjustable measuring cups require the pushing and pulling of stops for changing capacities for measuring.

Additionally, the adjustable measuring cups are not easily disassembled for cleaning after use. Such complete disassembly and dishwasher cleaning is essential in any successful cup for the present-day kitchen. Without complete disassembly, a cup cannot be thoroughly cleaned. And if not easy to reassemble, the discerning chef will not use it.

What is needed is an adjustable measuring device having a usable volume for measuring contents that can easily be disassembled for cleaning and adjusted to a plurality of discrete usable volumes during use. Additionally, what is needed is an adjustable measuring device that can be easily adjusted to the plurality of discrete usable volumes, without the need to visually inspect the measuring units on the outside of the adjustable measuring device. It is to such a device that the present invention is primarily directed.

BRIEF SUMMARY OF THE INVENTION

Briefly described, in preferred form, the present invention is an adjustable measuring device for measuring contents, such as liquids and granulated solids. The adjustable measuring device includes a housing having an upper open end, a platform movable between a lower position and an upper position, and an adjusting system for moving the platform through positions between the lower position and the upper position.

The adjustable measuring device has a usable volume for measuring that is defined as the volume between the platform and the upper open end of the housing. When the platform is in the lower position, the usable volume for measuring within the housing of the adjustable measuring device is maximized. Conversely, the usable volume for measuring within the housing of the adjustable measuring device is minimized when the platform is in the upper position.

The adjusting system can move the platform between a plurality of positions between the lower position and the upper position. Each of the positions provides a discrete usable volume within the housing of the adjustable measuring device. The usable volumes can be represented in many conventional measuring systems, such as the English system and the metric system.

Further, the adjusting system can comprise a restraint system and a discrete locking system. The restraint system is adapted to maintain the platform between the lower position and the upper position. Accordingly, the restraint system is designed to prevent the platform from moving beyond the upper position and/or below the lower position.

The discrete locking system is adapted to temporarily lock the platform in one of a plurality of predetermined positions. The adjusting system, therefore, can be snapped or locked into incremental measuring volumes, such as, but not limited to, ¼ cup, ⅓ cup, ½ cup, ⅔ cup, ¾ cup, 1 cup, 1¼ cup, 1⅓ cup, 1½ cup, 1⅔ cup, 1¾ cup, 2 cups, etc. The discrete locking system provides an individual with an easy and accurate mechanism for measuring contents using the adjustable measuring device.

The adjusting system can also comprise a rotatable dial element adapted to activate the adjusting system in moving the platform between the lower position, upper position, and plurality of predetermined positions. As a rotational force is applied to the rotatable dial element in a first direction, the adjusting system moves the platform from the lower position towards the upper position. Similarly, when a rotational force is applied to the rotatable dial element in a second, opposite direction, the adjusting system moves the platform from the upper position towards the lower position.

Although the present invention described above refers to systems, physical elements of the present invention include a housing having an upper open end, a platform containable within the housing and having a lower position and an upper position, a pusher base containable within the housing and receivable by the platform, and a rotatable dial element. The housing has a hollow interior that can receive contents such as liquids and granulated solids via the upper open end.

The pusher base is adapted to move the platform between the lower position and the upper position, thereby modifying the usable volume within the housing. The rotatable dial element engages a lower open end of the pusher base and is adapted to activate the pusher base into moving the platform between the lower position and the upper position. Typically, a first adjusting force applied to the rotatable dial element causes the pusher base to move the platform upward. A second, opposite adjusting force applied to the rotatable dial element causes the pusher base to move the platform downward.

The platform can comprise a restraint element adapted to engage the pusher base and prevent the pusher base from moving the platform beyond the upper position and/or below the lower position. Accordingly, the platform will not disengage with the pusher base during operation and, therefore, the pusher base will continue to be able to move the platform between the lower position and the upper position. The platform can also comprise a seal element adapted to seal the platform with the inside of the housing, thereby preventing leaking or loss of the contents being measured within the adjustable measuring device.

The rotatable dial element can also comprise a temporary locking mechanism (e.g., discrete locking system) that is adapted to temporarily snap or lock the platform in a plurality of predetermined positions. When the first adjusting force is applied to the rotatable dial element, the temporary locking mechanism will temporarily lock the platform in consecutive positions that represent smaller and smaller usable volumes within the housing, because the platform is moving upward. When the second adjusting force is applied to the rotatable dial element, the temporary locking mechanism will temporarily lock the platform in consecutive positions that represent larger and larger usable volumes within the housing, because the platform is moving downward.

In operation, beginning with the platform in the lower position, the bottom side of the top of the platform engages the top of the pusher base, thereby preventing the pusher base from moving the platform below the lower position. If a first adjusting force is applied to the rotational dial element, the pusher base will move the platform upward towards the upper position. As the platform moves upward, the bottom side of the top of the platform moves away from the top of the pusher base. At a predetermined position, the temporary locking mechanism of the rotatable dial element temporarily locks the platform, such that the usable volume within the housing is a predetermined volume of measuring. As the first adjusting force is continually applied to the rotational dial element, the temporary locking mechanism releases the platform allowing the pusher base to move the platform further upward towards the upper position.

The temporary locking mechanism of the rotatable dial element can temporarily lock the platform at any number of a plurality of predetermined positions, wherein each position represents a discrete usable volume within the housing of the adjustable measuring device. Once, however, the platform reaches the upper position, the restraint element of the platform engages the pusher base, thereby preventing the pusher base from moving the platform above the upper position.

If a second, opposite adjusting force is applied to the rotatable dial element, the pusher base will move the platform towards the lower position. As the platform moves downward, the bottom side of the top of the platform moves towards the top of the pusher base. As described above, the temporary locking mechanism of the rotatable dial element can temporarily lock the platform in a plurality of predetermined positions. Once, however, the platform reaches the lower position, the pusher base is prevented from moving the platform below the lower position.

A principle object of the present invention is to provide an adjustable measuring device having an adjustable usable volume for measuring contents.

Another object of the present invention is to provide an adjustable measuring device having a housing and a movable platform, such that the usable volume within the adjustable measuring device is defined as the volume between the platform and an upper open end of the housing.

Still another object of the present invention is to provide an adjustable measuring device having a movable platform having an upper position that represents the minimum usable volume within the adjustable measuring device and a lower position that represents the maximum usable volume within the adjustable measuring device.

It is another object of the present invention to provide an adjustable measuring device having a movable platform that temporarily locks into a plurality of predetermined positions, such that each predetermined position represents a discrete usable volume of measuring within the adjustable measuring device.

Yet another object of the present invention is to provide an adjustable measuring device having a pusher base for moving a platform between a lower position and an upper position.

Another object of the present invention is to provide an adjustable measuring device having a rotatable dial element that activates the movement of a platform between a lower position and an upper position.

Still another object of the present invention is to provide a restraint system adapted to prevent the platform from moving above the upper position and below the lower position.

It is another object of the invention to provide an adjustable measuring device that is easily disassembled for cleaning or replacement of parts without the use of tools.

These and other objects, features and advantages of the present invention will become more apparent upon reading the following specification in conjunction with the accompanying drawings.

DETAILED DESCRIPTION OF THE PREFERRED EMBODIMENTS

Figure 1A:
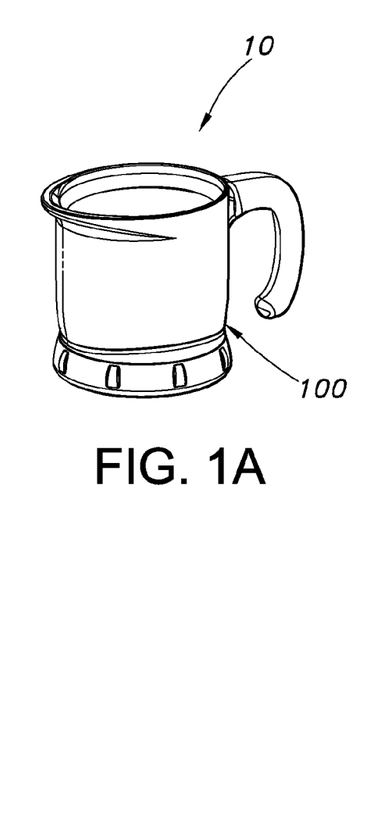
FIGS. 1A-1B, collectively known as FIG. 1, are diagrams illustrating a perspective view and an exploded view of an adjustable measuring device in accordance with preferred embodiments of the present invention.
Figure 1B:
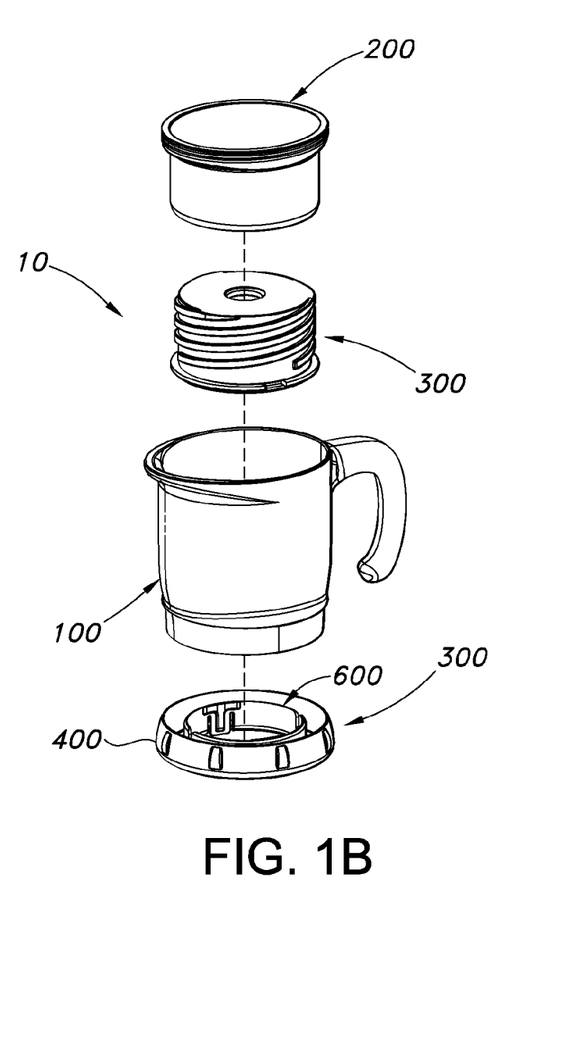

Referring now in detail to the drawing figures, wherein like reference numerals represent like parts throughout the several views, the present invention is an adjustable measuring device 10, shown in FIG. 1, and designed for measuring contents, such as liquids and granulated solids, in predetermined volumes. The usable volume within the adjustable measuring device 10 is easily adjustable so that different and desirable volumes can be utilized for the measuring of contents. The adjustable measuring device 10 can be configured in various sizes and shapes conducive for measuring liquids and granulated solids and, more particularly, for facilitating an adjustable usable volume within the adjustable measuring device 10.

As shown in FIGS. 1A-1B, the adjustable measuring device 10 comprises a housing 100, a platform 200 containable within the housing 100, and an adjusting system 300. The platform 200 has a lower position and an upper position, such that the usable volume of the adjustable measuring device 10 is defined as the volume between the platform 200 and an upper open end 105 of the housing 100. The adjusting system 300 is adapted to move the platform 200 between the lower position and the upper position and, thereby, adjusts the usable volume within the housing 100 of the adjustable measuring device 10. Although various volumes within the housing 100 can be defined, the usable volume within the housing 100 is maximized when the platform 200 is in the lower position. Conversely, when the platform 200 is in the upper position, the usable volume within the housing 100 is minimized.

The adjusting system 300 is further adapted to move the platform 200 between a plurality of positions between the lower position and the upper position. Each position, therefore, defines a different usable volume within the housing 100. In other words, the adjusting system 300 can position the platform 200 so that the usable volume within the housing 100 is greater than the minimum volume (e.g., when the platform 200 is in the upper position) and smaller than the maximum volume (e.g., when the platform 200 is in the lower position).

The adjusting system 300 can further comprise a restraint system 500, such that the restraint system 500 is adapted to maintain the platform 200 between the lower position and the upper position. Typically, the restraint system 500 prevents the platform 200 from disengaging with the adjusting system 300 when the platform 200 is moved to the upper position. Similarly, the restraint system 500 prevents the platform 200 from moving below the lower position.

Moreover, the adjusting system 300 can comprise a discrete locking system 600, such that the discrete locking system 600 is adapted to temporarily lock the platform 200 in a plurality of predetermined positions. Each predetermined position of the platform 200 defines a discrete and unique usable volume within the housing 100. For example and not limitation, the plurality of predetermined positions of the platform 200 can represent usable volumes within the housing 100 such as ¼ CUP, ⅓ CUP, ½ cup, ⅔ CUP, ¾ cup, 1 cup, 1¼ cup, 1⅓ cup, 1½ cup, 1⅔ CUP, 1¾ cup, 2 cups, etc. One skilled in the art will recognize that the plurality of predetermined positions of the platform 200 can be configured to represent any suitable unit of measure of volume including, but not limited to, the English system or the metric system. Accordingly, the discrete locking system 600 ensures that the usable volume within the housing 100 of the adjustable measuring device 10 can represent a plurality of discrete and predetermined volumes for measuring.

To facilitate movement of the platform 200 by the adjusting system 300, the adjusting system 300 can further comprise a rotatable dial element 400, such that the rotatable dial element 400 is adapted to move the platform 200 between the lower position and the upper position when a rotational force is applied to the rotatable dial element 400. In operation, the rotatable dial element 400 moves the platform 200 towards the lower position, when a first rotational force is applied to the rotatable dial element 400, while the rotatable dial element 400 moves the platform 200 towards the upper position, when a second, opposite rotational force is applied to the rotatable dial element 400.

In a preferred embodiment of the present invention, the upper open end 105 of the housing 100 is adapted to adequately receive contents for measuring. The position of the platform 200 within the housing 100 (e.g., the distance from the platform 200 to the upper open end 105 of the housing 100) defines the usable volume of the adjustable measuring device 10. Accordingly, only a predetermined amount of the contents can be contained within the adjustable measuring device 10 at a particular time, as defined by the position of the platform 200. When a different measuring volume is desired, a rotational force can be applied to the rotatable dial element 400 of the adjusting system 300, thereby moving the platform 200 to the position resulting in the desired volume within the housing 100.

More specifically, the adjustable measuring device 10 comprises a housing 100 having an upper open end 105; a platform 200 containable within the housing 100, such that the platform 200 has a lower position and an upper position; a pusher base 305 containable within the housing 100 and receivable within a lower open end 220 of the platform 200; and a rotatable dial element 400 adapted to engage a lower open end 315 of the pusher base 305. The rotatable dial element 400 is adapted to rotate the pusher base 305 when a rotational force is applied to the rotatable dial element 400, thereby causing the pusher base 305 to move the platform 200 between the lower position and the upper position.

FIG. 1B illustrates that the components of the adjustable measuring device 10 can be easily disassembled for cleaning and replacement of parts. More particularly, the components of the adjustable measuring device 10 can be easily assembled and disassembled without the use of tools. Accordingly, the adjustable measuring device 10 can be easily taken apart for cleaning or replacement of parts and then easily reassembled without the hassle of using tools, such as a screwdriver or pliers. One skilled in the art will recognize that the housing 100, platform 200, adjusting system 300 including the pusher base 305 and the rotatable dial element 400, restraint system 500, discrete locking system 600 and all of the components and/or elements thereof can be made of a variety of materials including, but not limited to, plastic, rubber, metal, ceramic, or other suitable materials or a combination thereof.

Figure 2A:
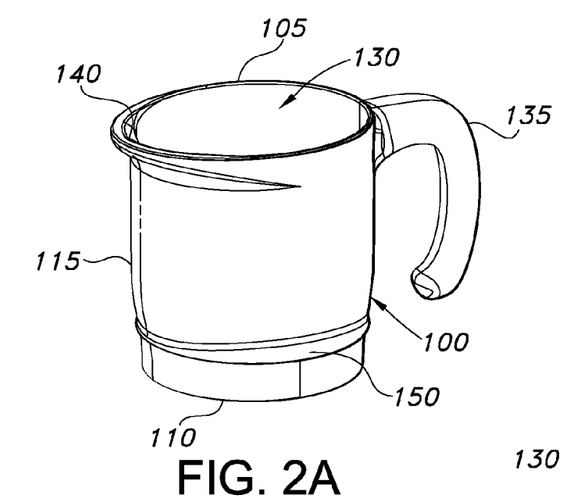
FIGS. 2A-2C, collectively known as FIG. 2, are diagrams illustrating perspective and sectional views of a housing in accordance with preferred embodiments of the present invention.
Figure 2B:
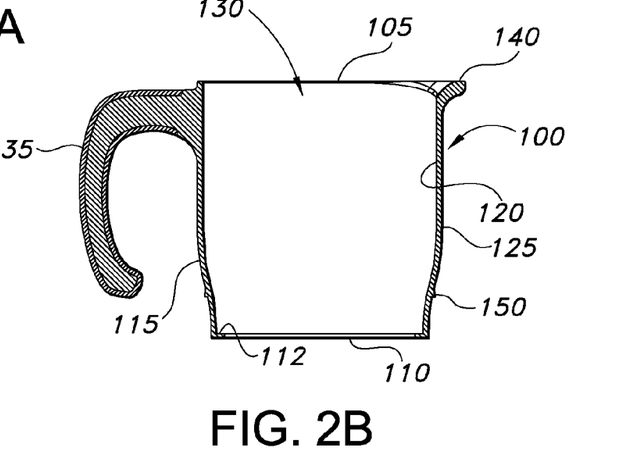
Figure 2C:
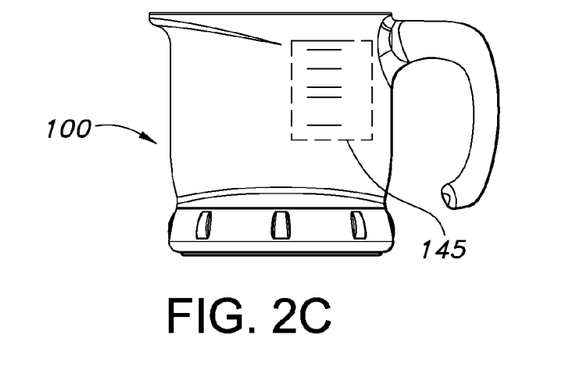

As illustrated in FIGS. 2A-2C, the housing 100 comprises an upper open end 105, a lower open end 110, and a peripheral side wall 115 defining a hollow interior 130 of the housing 100. The upper open end 105 of the housing 100 is in communication with the outside of the housing 100, thereby allowing contents to be provided to the inside of the housing 100 of the adjustable measuring device 10. The peripheral side wall 115 typically extends downwardly from the upper open end 105 of the housing 100 to the lower open end 110 of the housing 100. Also, the peripheral side wall 115 includes an inside wall 120 defining the inside of the housing 100 and an outside wall 125 defining the outside of the housing 100. The hollow interior 130 of the housing 100, as defined by the peripheral side wall 115, provides usable volume within the housing 100 to allow the contents (e.g., liquids and granulated solids) to be inserted for measuring. The lower open end 110 can include a lip portion 112 that extends inwardly into the housing 100. The lip portion 112 is adapted to engage the pusher base 305 received within the housing 100.

The housing 100 can further comprise a handle 135 for providing easy handling of the adjustable measuring device 10 during the filling, measuring, and pouring of the contents. Generally, the handle 135 is positioned on the outside wall 125 of the peripheral side wall 115 and near the upper open end 105 of the housing 100, such that the handle 135 extends downwardly for such a distance that is convenient for an individual utilizing the adjustable measuring device 10. The handle 135 of the housing 100 can also be made of a material or covered with a material that provides adequate texture for gripping by the individual, thereby reducing slippage of the handle and subsequent spilling of the contents of the adjustable measuring device 10.

The housing 100 can also comprise a pouring lip 140 (e.g., a spout) for providing easy pouring or dispensing of the contents measured in the adjustable measuring device 10. Typically, the pouring lip 140 is positioned on the outside wall 125 of the peripheral side wall 115 and near the upper open end 105 of the housing 100, such that the pouring lip 140 is generally on the side of the housing 100 opposite the handle 135.

Moreover, the housing 100 can comprise indicia 145 for indicating the usable volume within the housing 100 (e.g., for measuring) based on the position of the platform 200. The indicia 145 is generally positioned on the outside wall 125 of the peripheral side wall 115, such that the indicia 145 is generally between the upper open end 105 and the lower open end 110 of the housing 100. The position of the indicia 145 can be related to the plurality of positions of the platform 200 within the housing 100, which represents different usable volumes for measuring. For example, indicia 145 representing ½ cup can be marked on the outside wall 125 of the housing 100 at a location representing the position of the platform 200 within the housing 100 that defines a usable volume of ½ cup. The indicia 145 can represent various measuring units of volume such as, but not limited to, the English system and the metric system.

Additionally, the housing 100 can comprise a ridge element 150 adapted to engage the rotatable dial element 400 of the adjustable measuring device 10. The ridge element 150 is typically positioned on the outside wall 125 of the peripheral side wall 115 and near the lower open end 110 of the housing 100. Accordingly, the ridge element 150 ensures that the rotatable dial element 400 is positioned correctly over the lower open end 110 of the housing 100 during operation.

Figure 3A:
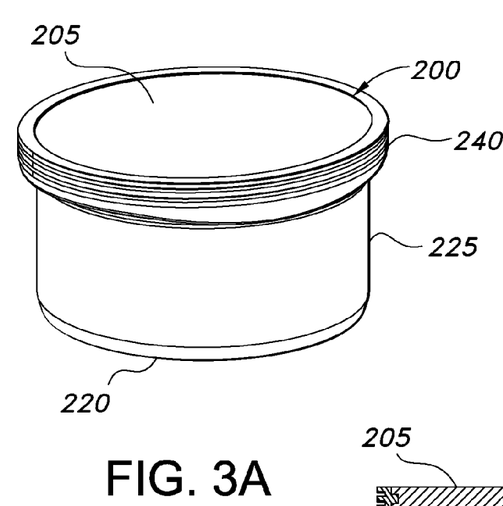
FIGS. 3A-3C, collectively known as FIG. 3, are diagrams illustrating perspective and sectional views of a platform in accordance with preferred embodiments of the present invention.
Figure 3B:
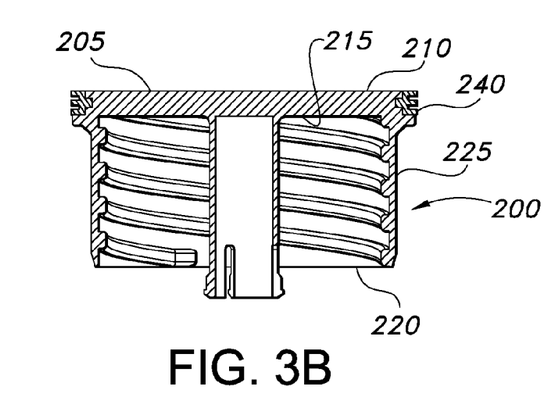
Figure 3C:
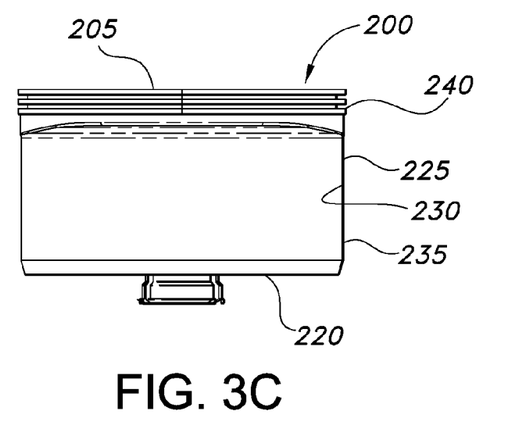

The platform 200, as illustrated in FIGS. 3A-3C, comprises a top 205, a lower open end 220, and a peripheral side wall 225. As described above, the top 205 of the platform 200 assists in defining the usable volume within the housing 100 of the adjustable measuring device 10. The usable volume for measuring is defined as the volume within the housing 100 between the top 205 of the platform 200 and the upper open end 105 of the housing 100. The top 205 includes an upper side 210 and a lower side 215, such that the upper side 210 of the top 205 acts as the inside bottom of the adjustable measuring device 10 during use.

The peripheral side wall 225 typically extends downwardly from the top 205 of the platform 200 to the lower open end 220 of the platform 200. Additionally, the peripheral side wall 225 includes an outside wall 235 and an inside wall 230. When the platform 200 is contained within the housing 100, the outside wall 235 of the platform 200 is positioned adjacent to the inside wall 120 of the housing 100, while the inside wall 230 of the platform 200 faces away from the inside wall 120 of the housing 100, thereby forming a hollow cavity below the top 205 of the platform 200.

The platform 200 can further comprise a sealing element 240 adapted to seal the platform 200 with the inside wall 120 of the housing 100, while maintaining alignment of the top 205 of the platform 200 within the housing 100. Such a sealing element 240 permits contents, especially liquids, to be adequately measured within the adjustable measuring device 10 without loss or leaking. The sealing element 240 is generally positioned on the outside wall 235 of the peripheral side wall 225 of the platform 200 and near the top 205 of the platform 200. In a preferred embodiment of the present invention, the sealing element 240 is a gasket or o-ring positioned around the perimeter of the top 205 of the platform 200.

The adjusting system 300, as illustrated in FIGS. 4A-4G, comprises a pusher base 305, an upper adjusting element 345, a lower adjusting element 350, and a rotatable dial element 400. In combination, the pusher base 305, upper adjusting element 345, lower adjusting element 350, and rotatable dial element 400 are adapted to move the platform 200 between the lower position and the upper position, thereby adjusting the usable volume for measuring within the housing 100 of the adjustable measuring device 10.

Figure 4A:
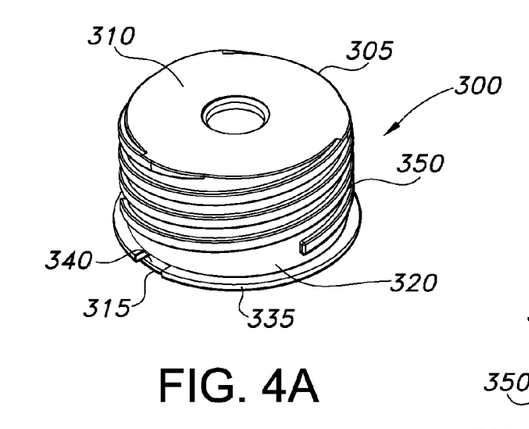
FIGS. 4A-4G, collectively known as FIG. 4, are diagrams illustrating perspective and sectional views of an adjusting system in accordance with preferred embodiments of the present invention.
Figure 4B:
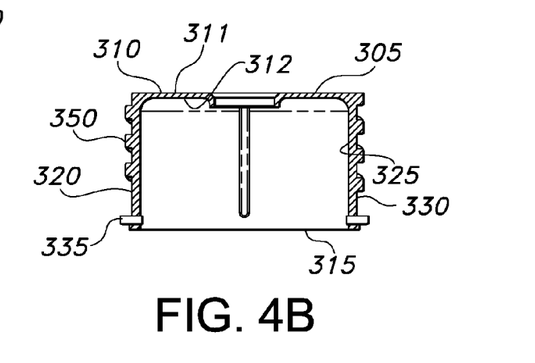
Figure 4C:
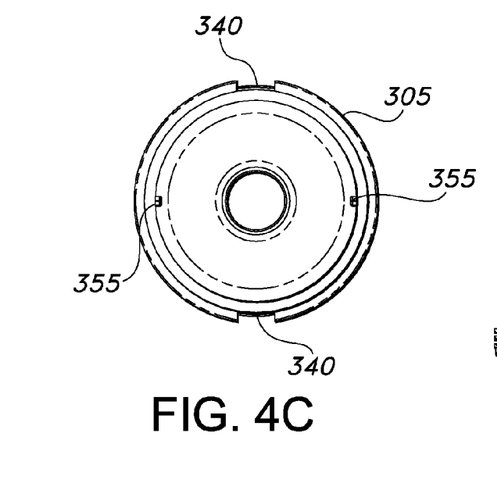

As illustrated in FIGS. 4A-4C, the pusher base 305 comprises a top 310, a lower open end 315, and a peripheral side wall 320. The top 310 includes an upper side 311 and a lower side 312, such that the upper side 311 of the top 310 is adapted to engage the lower open end 220 of the platform 200. The peripheral side wall 320 generally extends downwardly from the top 310 of the pusher base 305 to the lower open end 315 of the pusher base 305. Further, the peripheral side wall 320 includes an outside wall 330 and an inside wall 325.

The pusher base 305 is generally receivable by the lower open end 220 of the platform 200. In a preferred embodiment of the present invention, the pusher base 305 and platform 200 are configured so that the pusher base 305 can be substantially received within the platform 200 via the lower open end 220 of the platform 200. More specifically, when the pusher base 305 is received by the platform 200, the outside wall 330 of the peripheral side wall 320 of the pusher base 305 is adjacent to the inside wall 230 of the peripheral side wall 225 of the platform 200. The inside wall 325 of the pusher base 305 faces away from the inside wall 230 of the platform 200, thereby defining a hollow cavity below the top 310 of the pusher base 305.

The pusher base 305 can further comprise a ridge element 335 adapted to engage the lower open end 110 of the housing 100 and the rotatable dial element 400. The ridge element 335 ensures that the pusher base 305 remains positioned at the bottom of the inside of the housing 100. Accordingly, the ridge element 335 rests on the small lip portion 112 of the lower open end 110 of the housing 100, thereby ensuring that the pusher base 305 does not easily slide out of the housing 100 via the lower open end 110. The ridge element 335 is generally positioned on the outside wall 330 of the peripheral side wall 320 of the pusher base 305 and near the lower open end 315 of the pusher base 305. The ridge element 335 of the pusher base 305 can comprise a plurality of slot elements 340 adapted to engage the rotatable dial element 400 and assist in aligning the pusher base 305 with the rotatable dial element 400 during proper assembly.

Also, the pusher base 305 can comprise a plurality of pusher tab elements 355 adapted to engage the rotatable dial element 400. The plurality of pusher tab elements 355 ensures that the pusher base 305 remains in communication with the rotatable dial element 400 during use. More specifically, the plurality of pusher tab elements 355 assists in maintaining a connection between the pusher base 305 and the rotatable dial element 400, such that the pusher base 305 rotates with the rotatable dial element 400 when a rotational force is applied to the rotatable dial element 400. Each pusher tab element 355 is evenly positioned on the inside wall 325 of the pusher base 305 and near the lower open end 315 of the pusher base 305.

Figure 4D:
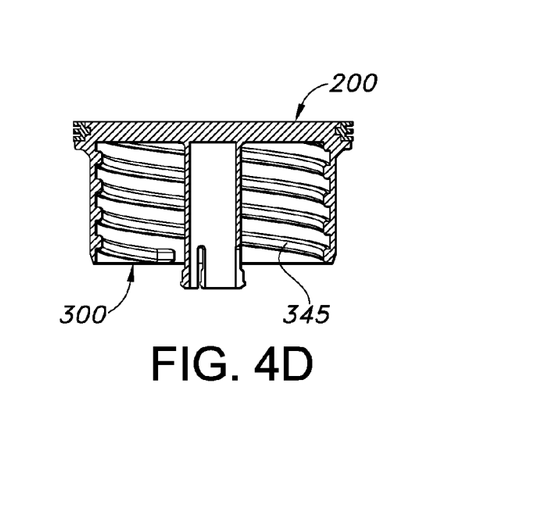

The upper adjusting element 345 and the lower adjusting element 350, as illustrated in FIGS. 4A and 4D, are adapted to move the platform 200 between the lower position and the upper position. The upper adjusting element 345 is positioned on the inside wall 230 of the peripheral side wall 225 of the platform 200, while the lower adjusting element 350 is positioned on the outside wall 330 of the peripheral side wall 320 of the pusher base 305. The upper adjusting element 345 and the lower adjusting element 350 are adapted to engage each other, when the pusher base 305 is received within the platform 200. More specifically, the interaction between the upper adjusting element 345 and the lower adjusting element 350 directly affects the position of the platform 200 within the housing 100.

The pusher base 305 is slideably received by the platform 200. Accordingly, as the pusher base 305 is more substantially received by the platform 200, the platform 200 is generally moved towards the lower position by the upper adjusting element 345 and the lower adjusting element 350 (e.g., the upper adjusting element 345 and the lower adjusting element 350 begin to engage more completely). Likewise, as the pusher base 306 is less substantially received by the platform 200, the platform 200 is generally moved towards the upper position by the upper adjusting element 345 and the lower adjusting element 350 (e.g., the upper adjusting element 345 and the lower adjusting element 350 begin to disengage). Such movement of the platform 200 modifies the usable volume for measuring within the housing 100 of the adjustable measuring device 10.

In a preferred embodiment of the present invention, the upper adjusting element 345 comprises an inner thread and the lower adjusting element 350 comprises an outer thread, such that the inner thread of the upper adjusting element 345 can fully engage the outer thread of the lower adjusting element 350 (e.g., the pusher base 305 can screw into the lower open end 220 of the platform 200). Accordingly, a horizontal rotation of the pusher base 305 will cause the outer thread of the lower adjusting element 350 to more fully engage the inner thread of the upper adjusting element 345, thereby causing the platform 200 to vertically move towards the lower position (e.g., increasing the usable volume within the housing 100). Similarly, an opposite, horizontal rotation of the pusher base 305 will cause the outer thread of the lower adjusting element 350 to more fully disengage with the inner thread of the upper adjusting element 345, thereby causing the platform 200 to vertically move towards the upper position (e.g., decreasing the usable volume within the housing 100). One skilled in the art will recognize that the upper adjusting element 345 and the lower adjusting element 350 can comprise alternative mechanisms that permit the platform 200 to engage and disengage with the pusher base 305, within the scope of the present invention.

Figure 4E:
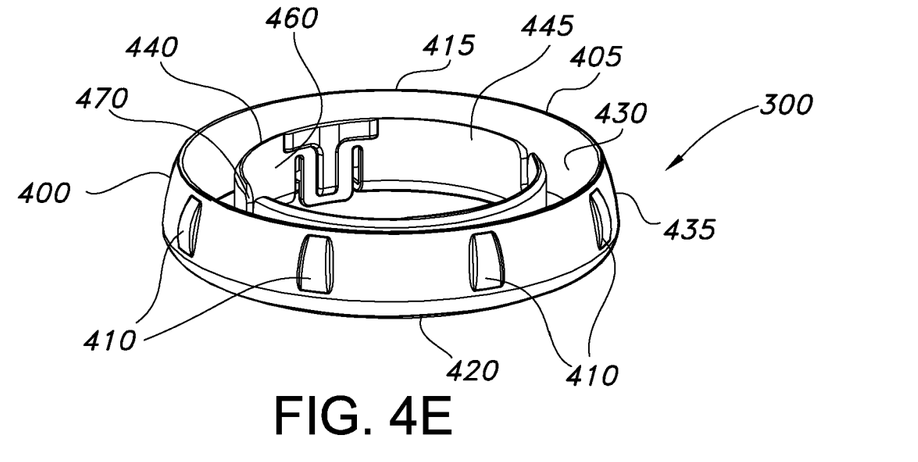
Figure 4F:
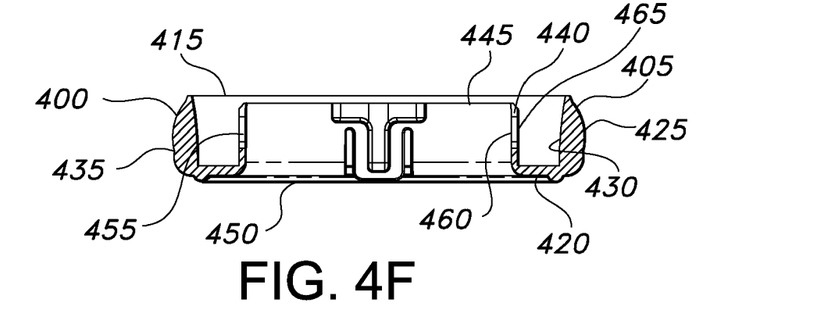
Figure 4G:
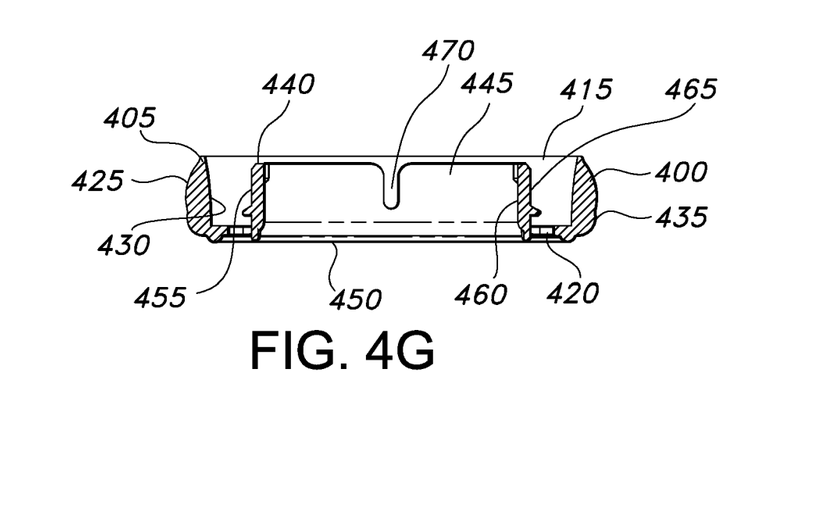

As illustrated in FIGS. 4E-4G, the rotatable dial element 400 comprises an outer dial portion 405 and an inner dial portion 440. The outer dial portion 405 is adapted to engage the ridge element 150 of the housing 100, while the inner dial portion 440 is adapted to engage the lower open end 315 of the pusher base 305. Accordingly, the outer dial portion 405 is generally positioned outside the housing 100 and the inner dial portion 440 is generally positioned inside the housing 100.

The outer dial portion 405 comprises an upper open end 415, a bottom 420, and a peripheral side wall 425. The upper open end 415 of the outer dial portion 405 is adapted to engage the ridge element 150 of the housing 100, such that the upper open end 415 is adjacent to the lower portion of the ridge element 150. The peripheral side wall 425 generally extends downwardly from the upper open end 415 of the outer dial portion 405 to the bottom 420 of the outer dial portion 405. Further, the peripheral side wall 425 includes an outside wall 435 and an inside wall 430. When the rotatable dial element 400 is positioned on the bottom of the housing 100, the inside wall 430 of the peripheral side wall 425 of the outer dial portion 405 is adjacent to the outside wall 125 of the peripheral side wall 115 of the housing 100 that extends below the ridge element 150 of the housing 100.

Further, the outer dial portion 405 can comprise a plurality of grip elements 410 adapted to provide adequate gripping for an individual applying a rotational force upon the rotatable dial element 400. Generally, each grip element 410 is positioned evenly around the outside wall 435 of the peripheral side wall 425 of the outer dial portion 405. One skilled in the art will recognize that the plurality of grip elements 410 can be made of a material or covered with a material that provides adequate texture for gripping by the individual, thereby assisting in the rotational force applied to the rotatable dial element 400 during operation of the adjustable measuring device 10.

The inner dial portion 440 can be generally defined by the bottom 420 of the outer dial portion 405. The inner dial portion 440 comprises an open upper end 445, a lower open end 450, and a peripheral side wall 455. The open upper end 445 is adapted to engage the lower open end 315 of the pusher base 305. The peripheral side wall 455 generally extends downwardly from the upper open end 445 of the inner dial portion 440 to the lower open end 450 of the inner dial portion 440. Further, the peripheral side wall 455 includes an outside wall 465 and an inside wall 460.

Moreover, the inner dial portion 440 can comprise a plurality of slot elements 470 adapted to engage the plurality of pusher tab elements 355 of the pusher base 305. Each slot element 470 is generally evenly spaced around the peripheral side wall 455 of the inner dial portion 440, such that each slot element 470 will engage a pusher tab element 355 when the inner dial portion 440 of the rotatable dial element 400 engages the lower open end 315 of the pusher base 305. To accommodate such engagement of the plurality of pusher tab elements 355 and the plurality of slot elements 470, the outside wall 465 of the peripheral side wall 455 of the inner dial portion 440 is adjacent to the inner wall 325 of the peripheral side wall 320 of the pusher base 305. The communication between the plurality of slot elements 470 and the plurality of pusher tab elements 355 facilitates a connection between the rotatable dial element 400 and the pusher base 305, such that rotation of the rotatable dial element 400 simultaneously rotates the pusher base 305 positioned in the housing 100 of the adjustable measuring device 10.

The outer dial portion 405 is adapted for rotation, such that a rotational force upon the outer dial portion 405 causes the inner dial portion 440 to rotate and, consequently, the pusher base 305 to rotate. Rotation of the pusher base 305 activates engagement or disengagement of the upper adjusting element 345 and the lower adjusting element 350, thereby causing the platform 200 to move between the lower position and the upper position.

Figure 5A:
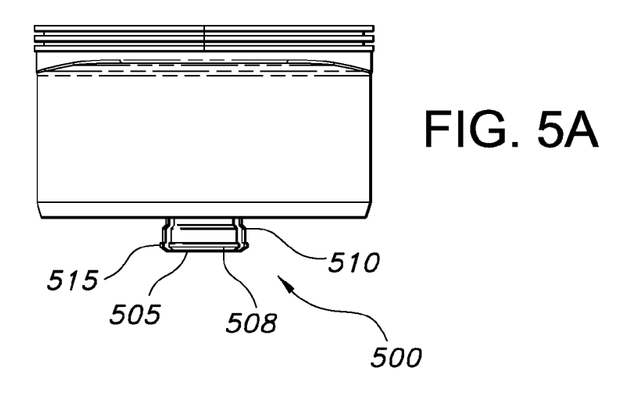
FIGS. 5A-5C, collectively known as FIG. 5, are diagrams illustrating perspective and sectional views of a restraint system in accordance with preferred embodiments of the present invention.
Figure 5B:
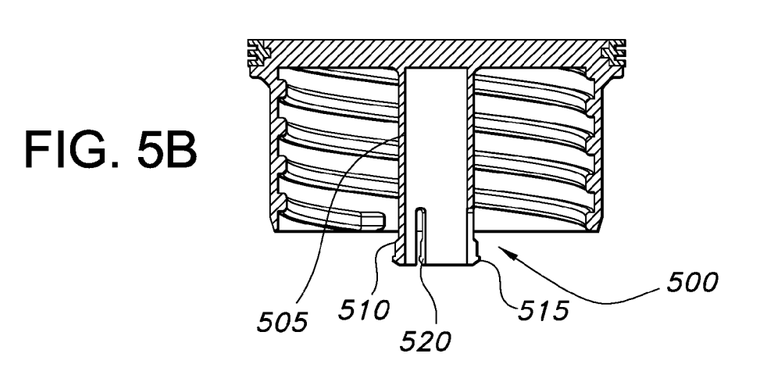
Figure 5C:
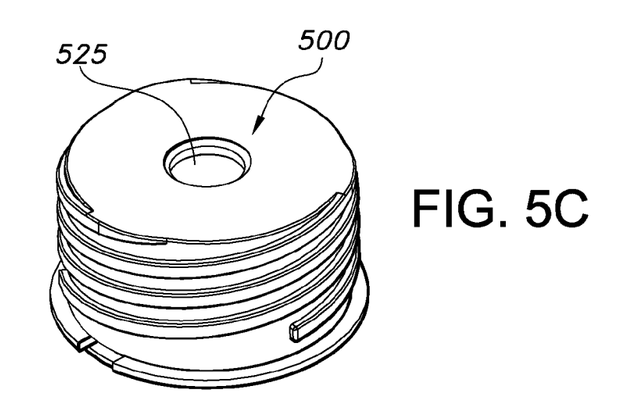
Figure 6A:
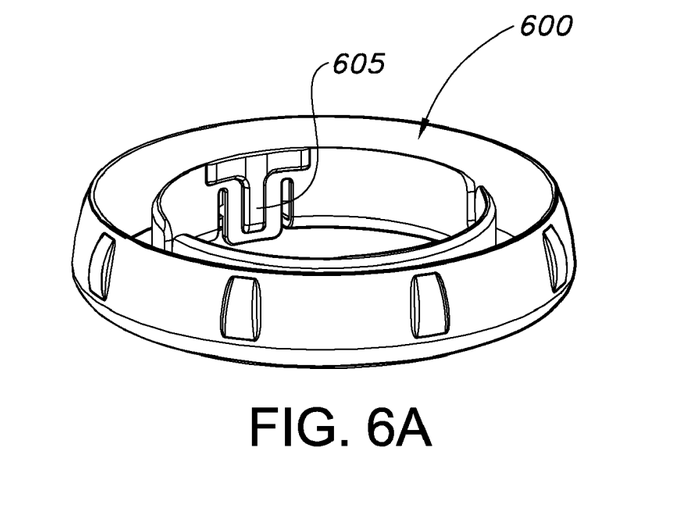
FIGS. 6A-6C, collectively known as FIG. 6, are diagrams illustrating perspective and sectional views of a discrete locking system in accordance with preferred embodiments of the present invention.
Figure 6B:
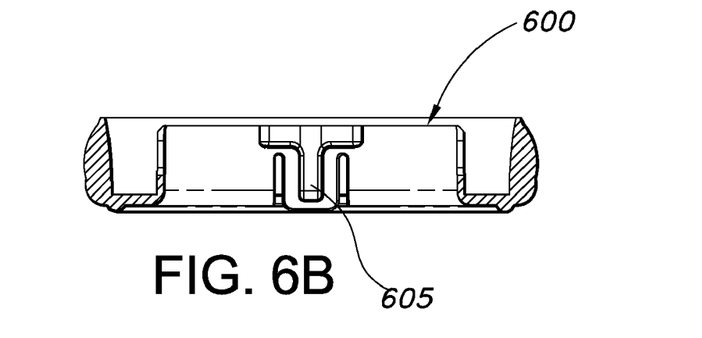
Figure 6C:
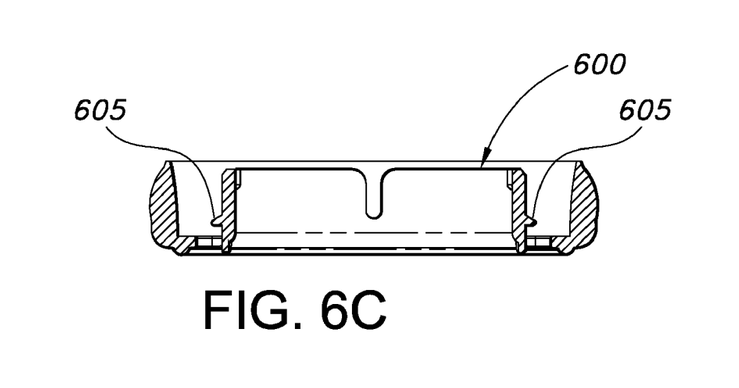

As illustrated in FIGS. 5 and 6, the adjusting system 300 can further comprise a restraint system 500 and a discrete locking system 600. As described above, the restraint system 500 maintains the platform 200 between the lower position and the upper position. The discrete locking system 600 is adapted to temporarily lock the adjusting system 300 (e.g., the platform 200 and pusher base 305) in a plurality of predetermined positions, wherein each predetermined position represents a unique and desired usable volume for measuring within the housing 100 of the adjustable measuring device 10.

The restraint system 500, as illustrated in FIGS. 5A-5C, comprises a restraint element 505 and an aperture 525 defined by the top 310 of the pusher base 305. The restraint element 505 is generally positioned in the center of the lower side 215 of the top 205 of the platform 200 and extends downwardly from the lower side 215 of the top 205 of the platform 200 to just beyond the lower open end 220 of the platform 200. More specifically, the restraint element 505 extends far enough beyond the lower open end 220 of the platform 200 to adequately engage the aperture 525 of the top 310 of the pusher base 305, such that the lower end 508 of the restraint element 505 is positioned below the lower side 312 of the top 310 of the pusher base 305. The aperture 525 of the top 310 of the pusher base 305 is adapted to engage the restraint element 505, such that the lower end 508 of the restraint element 505 can pass through the aperture 525 into the hollow cavity below the top 310 of the pusher base 305.

The restraint element 505 comprises a plurality of slot elements 520, such that the slot elements 520 are positioned on the lower end 508 of the restraint element 505. The plurality of slot elements 520 is adapted to permit the lower end 508 of the restraint element 505 to slide into the aperture 525 of the top 310 of the pusher base 305. In other words, the vertical slot elements 520 of the restraint element 505 provide the lower end 508 of the restraint element 505 with enough flexibility to push through the aperture 525 of the top 310 of the pusher base 305. After the lower end 508 of the restraint element 505 passes through the aperture 525, the lower end 508 of the restraint element 505 flexes back to its original position, thereby temporarily preventing the lower end 508 of the restraint element 505 from disengaging with the aperture 525 of the pusher base 503.

Further, the restraint element 505 comprises a lower ridge element 515 and an upper ridge element 510, such that the lower ridge element 515 and the upper ridge element 510 are positioned near the lower end 508 of the restraint element 505. The lower ridge element 515 is proximate to the lower end 508 of the restraint element 505, while the upper ridge element 510 is distal to the lower end 508 of the restraint element 505. The lower ridge element 515 and the upper ridge element 510 are adapted to engage the lower side 312 of the top 310 of the pusher base 305 and maintain the lower end 508 of the restraint element 505 within the aperture 525 of the top 310 of the pusher base 305.

In operation, as the platform 200 is moved from the lower position to the upper position, the lower end 508 of the restraint element 505 moves upward within the cavity located below the top 310 of the pusher base 305. When the platform 200 reaches the upper position, the upper ridge element 510 and the lower ridge element 515 engage the lower side 312 of the top 310 of the pusher base 305, thereby preventing the platform 200 from disengaging with the pusher base 305. Accordingly, the platform 200 is maintained at the upper position. As the platform 200 is moved from the upper position to the lower position, the lower end 508 of the restraint element 505 moves downward within the cavity located below the top 310 of the pusher base 305. When the platform 200 reaches the lower position, the lower side 215 of the top 205 of the platform 200 engages the upper side 311 of the top 310 of the pusher base 305, thereby preventing the platform 200 from moving below the lower position.

The discrete locking system 600, as illustrated in FIGS. 6A-6C, comprises a plurality of tab elements 605 and a plurality of restraint elements 610. Each tab element 605 is generally evenly positioned on the outside wall 465 of the peripheral side wall 455 of the inner dial portion 440. Each restraint element 610 is generally positioned evenly between the inner wall 430 of the peripheral side wall 425 of the outer dial portion 405 and the outer wall 465 of the peripheral side wall 455 of the inner dial portion 440. For example, each restraint element 610 may be positioned evenly on the inside wall 120 of the housing 100 near the lower open end 110. The plurality of restraint elements 610 is adapted to engage the plurality of tab elements 605 to temporarily lock the platform 200 in a plurality of predetermined positions, wherein each position of the platform 200 defines a different usable volume for measuring within the housing 100.

Additionally, the plurality of tab elements 605 can be adapted to lock the rotatable dial element 400 with the pusher base 305. Further, the plurality of tab elements 605 allow the adjustable measuring device 10 to be easily disassembled and assembled for cleaning, without the use of tools.

In an alternative embodiment of the present invention, the plurality of tab elements 605 can be evenly positioned on the inside wall 430 of the outer dial portion 405 of the rotatable dial element 400. The plurality of restraint elements 610 can be evenly positioned on the outside wall 125 of the housing 100 near the lower open end 110. As the outer dial portion 405 of the rotatable dial element 400 rotates, the tab elements 605 can engage with the restraint elements 610, thereby temporarily locking the platform 200 into a plurality of predetermined positions.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. An adjustable measuring device having a usable volume, the adjustable measuring device comprising:

a housing having an upper open end;

a platform containable within the housing, wherein the platform has a lower position and an upper position, and wherein the usable volume is defined as a volume between the platform and the upper open end of the housing; and an adjusting system adapted to move the platform between the lower position and the upper position;

wherein the adjusting system comprises a pusher base containable within the housing and receivable within a lower open end of the platform, wherein the pusher base is adapted to move the platform between the lower position and the upper position; and wherein the pusher base comprises a lower adjusting element positioned on the outside wall of the pusher base.

2. The adjustable measuring device of claim 1, wherein the adjusting system is further adapted to move the platform between a plurality of positions between the lower position and the upper position, wherein each position of the plurality of positions results in a different usable volume within the housing.

3. The adjustable measuring device of claim 1, wherein the adjusting system further comprises a restraint system adapted to maintain the platform between the lower position and the upper position.

4. The adjustable measuring device of claim 2, wherein the adjusting system comprises a discrete locking system adapted to temporarily lock the platform in the plurality of positions.

5. The adjustable measuring device of claim 3, wherein the restraint system comprises a restraint element centrally positioned on a lower side of the top of the platform, wherein the restraint element extends downwardly from the top of the platform beyond a lower open end of the platform.

6. The adjustable measuring device of claim 1, wherein the adjusting system further comprises a rotatable dial element adapted to move the platform between the lower position and the upper position when a rotational force is applied to the rotatable dial element.

7. The adjustable measuring device of claim 6, wherein the rotatable dial element comprises a plurality of grip elements evenly positioned on an outer wall of the rotatable dial element, wherein the plurality of grip elements is adapted to allow easy rotation of the rotatable dial element.

8. An adjustable measuring device having a usable volume, the adjustable measuring device comprising:

a housing having an upper open end;

a platform containable within the housing, wherein the platform has a lower position and an upper position, and wherein the usable volume is defined as a volume between the platform and the upper open end of the housing;

a pusher base containable within the housing and receivable within a lower open end of the platform, wherein the pusher base is adapted to move the platform between the lower position and the upper position; and a rotatable dial element adapted to engage a lower open end of the pusher base, wherein a rotation of the rotatable dial element activates the pusher base to move the platform between the lower position and the upper position;

wherein the housing further comprises a ridge element positioned on an outside wall of the housing near a lower open end of the housing, wherein the ridge element is adapted to maintain the rotatable dial element at a predetermined position on the housing; and wherein the pusher base comprises a lower adjusting element positioned on the outside wall of the pusher base.

9. The adjustable measuring device of claim 8, wherein the housing further comprises indicia positioned on the outside wall of the housing, wherein the indicia indicates different measuring volumes within the housing.

10. The adjustable measuring device of claim 8, wherein the housing comprises a handle positioned on the outside wall of the housing near the upper open end.

11. The adjustable measuring device of claim 8, wherein the platform further comprises a sealing element positioned on a periphery of a top of the platform.

12. The adjustable measuring device of claim 10, wherein the housing comprises a pouring lip positioned on the outside wall of the housing near the upper open end, wherein the pouring lip is generally positioned on an opposite site of the housing from the handle.

13. The adjustable measuring device of claim 8, wherein the platform further comprises an upper adjusting element positioned on an inside wall of the platform, wherein interaction between the upper adjusting element and the lower adjusting element moves the platform between the lower position and the upper position.

14. The adjustable measuring device of claim 13, wherein the lower adjusting element comprises an outer thread and the upper adjusting element comprises an inner thread, wherein the lower adjusting element rotatably engages the upper adjusting element.

15. The adjustable measuring device of claim 8, wherein the rotatable dial element comprises a plurality of grip elements evenly positioned on an outer wall of the rotatable dial element, wherein the plurality of grip elements is adapted to allow easy rotation of the rotatable dial element.

16. An adjustable measuring device having a usable volume, the adjustable measuring device comprising:

a housing having an upper open end;

a platform containable within the housing, wherein the platform has a lower position and an upper position, and wherein the usable volume is defined as a volume between a top of the platform and the upper open end of the housing;

a pusher base containable within the housing and receivable within a lower open end of the platform, wherein the pusher base is adapted to move the platform between the lower position and the upper position;

a rotatable dial element adapted to engage a lower open end of the pusher base, wherein a rotation of the rotatable dial element activates the pusher base to move the platform between the lower position and the upper position; and a restraint system adapted to maintain the platform between the lower position and the upper position;

wherein the rotatable dial element comprises a plurality of grip elements evenly positioned on an outer wall of the rotatable dial element, wherein the plurality of grip elements is adapted to allow easy rotation of the rotatable dial element; and wherein the restraint system comprises:

a restraint element centrally positioned on a lower side of the top of the platform, wherein the restraint element extends downwardly from the top of the platform beyond a lower open end of the platform; and an aperture defined within a top of the pusher base, wherein the aperture permits the pusher base to receive a lower end of the restraint element.

17. The adjustable measuring device of claim 16, wherein the rotatable dial element comprises a discrete locking system adapted to temporarily lock the platform in a plurality of positions, wherein each position of the plurality of positions defines a different usable volume within the housing.

18. The adjustable measuring device of claim 16, wherein the lower end of the restraint element comprises a plurality of slots, such that the plurality of slots is adapted to permit the lower end of the restraint element to slide within the aperture of the pusher base.

19. The adjustable measuring device of claim 18, wherein the restraint element further comprises:
   a lower ridge positioned near the lower end of the restraint element; and
   an upper ridge positioned in proximity to the lower ridge, wherein the lower ridge and the upper ridge are adapted to engage a lower side of the top of the pusher base and maintain the lower end of the restraint element within the pusher base, thereby preventing the platform from moving beyond the upper position.

* * * * *